United States Patent
Ramesh (10) Patent No.: US 9,802,184 B2
(45) Date of Patent: Oct. 31, 2017

(54) METHOD FOR RECYCLING A PLASTIC (71) Applicant: Swaminathan Ramesh, Canton, MI (US)

(72) Inventor: Swaminathan Ramesh, Canton, MI (US)

(*) Notice: Subject to any disclaimer, the term of this patent is extended or adjusted under 35 U.S.C. 154(b) by 154 days.

(21) Appl. No.: 14/366,873

(22) PCT Filed: Dec. 21, 2012

(86) PCT No.: PCT/US2012/071334
§ 371 (c)(1),
(2) Date: Jun. 19, 2014

(87) PCT Pub. No.: WO2013/096815
PCT Pub. Date: Jun. 27, 2013

(65) Prior Publication Data
US 2014/0364663 A1 Dec. 11, 2014

Related U.S. Application Data

(60) Provisional application No. 61/630,894, filed on Dec. 21, 2011.

(51) Int. Cl.
*C10G 1/10* (2006.01)
*C10G 1/08* (2006.01)
(Continued)

(52) U.S. Cl.
CPC ....... *B01J 31/2295* (2013.01); *B01J 29/0354* (2013.01); *B01J 29/082* (2013.01);
(Continued)

(58) Field of Classification Search
CPC .................................. C10G 1/10; C10G 1/08
(Continued)

(56) References Cited

U.S. PATENT DOCUMENTS 3,226,339 A 12/1965 Frilette et al.
3,236,761 A 2/1966 Rabo et al.
(Continued)

FOREIGN PATENT DOCUMENTS

KR 20020023472 A 3/2002
WO WO 2013096794 A1 6/2013

OTHER PUBLICATIONS

English language abstract for KR 20020023472 extracted from espacenet.com database on Jul. 31, 2014, 1 page.
(Continued)

*Primary Examiner* — In Suk Bullock
*Assistant Examiner* — Youngsul Jeong
(74) *Attorney, Agent, or Firm* — Howard & Howard Attorneys PLLC (57) ABSTRACT

A method of recycling a plastic includes decomposing the plastic in the presence of a catalyst to form hydrocarbons. The catalyst includes a porous support having an exterior surface and defining at least one pore therein. The catalyst also includes a depolymerization catalyst component disposed on the exterior surface of the porous support for depolymerizing the plastic. The depolymerization catalyst component includes a Ziegler-Natta catalyst, a Group IIA oxide catalyst, or a combination thereof. The catalyst further includes a reducing catalyst component disposed in the at least one pore.

15 Claims, 5 Drawing Sheets (51) Int. Cl.
- *B01J 31/22* (2006.01)
- *C08J 11/16* (2006.01)
- *B01J 29/035* (2006.01)
- *B01J 29/08* (2006.01)

(52) U.S. Cl.
CPC .............. *C08J 11/16* (2013.01); *C10G 1/10* (2013.01); *B01J 2231/641* (2013.01); *C08J 2323/06* (2013.01); *C08J 2323/10* (2013.01); *Y02W 30/705* (2015.05)

(58) Field of Classification Search
USPC ........................................ 585/241
See application file for complete search history.

(56) References Cited

U.S. PATENT DOCUMENTS

| | | | |
|---|---|---|---|
| 5,041,401 A | 8/1991 | Schoennagel et al. | |
| 5,079,385 A | 1/1992 | Wu | |
| 5,567,666 A | 10/1996 | Beck et al. | |
| 5,686,055 A | 11/1997 | Takahashi et al. | |
| 5,738,025 A | 4/1998 | Tachibana | |
| 6,171,475 B1 | 1/2001 | Defaud et al. | |
| 6,184,430 B1 | 2/2001 | Venkatesh et al. | |
| 6,936,561 B2 | 8/2005 | Marques et al. | |
| 6,958,305 B2 | 10/2005 | Verduijn et al. | |
| 7,276,638 B2 | 10/2007 | Dakka et al. | |
| 7,531,703 B2 | 5/2009 | Ramesh et al. | |
| 2005/0148487 A1* | 7/2005 | Brownscombe | C10G 1/10 510/446 |
| 2005/0221975 A1 | 10/2005 | Renock et al. | |
| 2007/0083068 A1* | 4/2007 | Ramesh | C08F 8/50 585/241 |
| 2010/0041929 A1 | 2/2010 | Bedard et al. | |
| 2012/0024776 A1 | 2/2012 | Garcia-Martinez | |
| 2012/0059134 A1 | 3/2012 | Yang et al. | |
| 2012/0149955 A1 | 6/2012 | Fecant | |
| 2012/0165583 A1 | 6/2012 | Garforth et al. | |
| 2012/0215043 A1 | 8/2012 | Gaffney | |
| 2012/0253093 A1 | 10/2012 | Ercan | |
| 2013/0072652 A1 | 3/2013 | Fantinel et al. | |

OTHER PUBLICATIONS

International Search Report for PCT/US2012/071291 dated Apr. 17, 2013, 3 pages.
International Search Report for PCT/US2012/071334 dated Mar. 6, 2013, 3 pages.
Richard Baker Harrison, "13X Molecular Sieve", 2013, 1 page.

* cited by examiner

METHOD FOR RECYCLING A PLASTIC

RELATED APPLICATIONS

This application is the National Stage of International Patent Application No. PCT/US2012/071334, filed on Dec. 21, 2012, which claims priority to and all the advantages of U.S. Provisional Patent Application Ser. No. 61/630,894, filed Dec. 21, 2011, which is expressly incorporated herein by reference in its entirety.

FIELD OF THE DISCLOSURE

The present disclosure generally relates to a method for recycling a plastic. More specifically, the present disclosure relates to a method of recycling the plastic in the presence of a catalyst including a depolymerization catalyst component and a reducing catalyst component.

BACKGROUND

Plastics are typically made from non-renewable petroleum resources and are often non-biodegradable. In the United States, plastics are produced in amounts exceeding 115,000 million pounds annually. Plastics are used in many industries to form products for sale in both industrial and residential markets. In industrial markets, plastics are used to form packaging, insulation, construction products, etc. In residential markets, plastics are used to form bottles, containers, and the like.

Plastics such as polyethylene terephthalate (PET), high density polyethylene (HDPE), and polyvinyl chloride (PVC), have commonly accepted Recycling Codes of from 1 to 3, respectively, as developed by the American Plastics Council. These aforementioned plastics are more widely recycled and re-used than many other types of plastics. However, plastics such as polyethylenes having Recycling Codes of 2, 4, and 7, polypropylene having a Recycling Code of 5, and polystyrene having a Recycling Code of 6, can also be recycled. Yet, recycling efforts for polyethylenes, polypropylene, and polystyrene have not been maximized.

Only a small fraction of the plastics produced each year are recycled and re-used. To ease in recycling, the plastics are usually crushed, melted, and/or broken down. Plastics that are not recycled and re-used present potential environmental pollution risks when discarded, are not utilized for energy or raw materials, and contribute to an increased reliance on non-renewable petroleum resources. Traditionally, plastics are recycled according to one of two methods including open- and closed-loop recycling. Closed-loop recycling involves using the plastic as an input to make the same product again. Open-loop recycling involves using the plastic as an input to make other products. For example, open-loop recycling may be used to form diesel fuel using the plastic as an input. However, neither of these methods are particularly efficient because of the complexities involved in processing plastics of different colors, textures, and consistencies and producing other products.

One particular type of open loop recycling includes decomposition of a plastic by heating, in the absence of a catalyst, to reverse polymerize the plastic and form monomers. After the plastic is decomposed, the monomers can then be used in a variety of manufacturing or commercial processes. Traditionally, this decomposition through heating forms monomers having an inconsistent and/or unpredictable number of carbon atoms, while leaving much of the plastic unusable. Formation of monomers having unpredictable numbers of carbon atoms inhibits the monomers from being effectively recycled into other products.

Another particular type of open-loop recycling includes catalytic cracking, which improves on the decomposition of plastic by heating alone. As is known in the art, catalytic cracking involves reverse polymerizing a plastic, in the presence of a catalyst, to form monomers. Traditionally, the catalysts used in catalytic cracking procedures include classic Lewis acids such as $AlCl_3$, metal tetrachloroaluminates, zeolites, superacids, gallosilicates, metals on carbon, and basic oxides. However, many of these catalysts are ineffective in selectively cracking the plastics to form specific monomers. Although traditional catalytic cracking is more efficient in forming monomers than simple decomposition of plastics through heating alone, many of these traditional catalysts still form monomers having an inconsistent and/or unpredictable number of carbon atoms and still leave much of the plastic unusable and un-cracked. Accordingly, there remains an opportunity to develop an improved method for recycling plastics.

SUMMARY OF THE DISCLOSURE AND ADVANTAGES

The present disclosure provides a method of recycling a plastic. The method includes decomposing the plastic in the presence of a catalyst to form hydrocarbons. The catalyst includes a porous support having an exterior surface and defining at least one pore therein. The catalyst also includes a depolymerization catalyst component disposed on the exterior surface of the porous support for depolymerizing the plastic. The depolymerization catalyst component includes a Ziegler-Natta catalyst, a Group IIA oxide catalyst, or a combination thereof. The catalyst further includes a reducing catalyst component disposed in the at least one pore.

The method of the instant disclosure tends to allow for controlled and efficient formation of specific hydrocarbons e.g. having from 4 to 40 carbons, which can be used as fuel. The method also tends to allow for increased decomposition of plastic thereby reducing reliance on, and slowing depletion of, non-renewable energy sources. The method further tends to reduce a need for new mining and drilling operations on unused land and also reduces energy expenditure associated with refining petroleum to form fuels. Still further, the method tends to reduce potential environmental pollution by allowing for the decomposition of the plastics that are discarded in landfills and by reducing runoff and soil erosion from the mining and drilling operations. The catalyst of the method tends to contribute to decomposition of the plastic and direct formation of these hydrocarbons, typically without a need for additional processing or purification. Also, the catalyst tends to be inexpensive to dispose of or recycle.

BRIEF DESCRIPTION OF THE DRAWINGS

Advantages of the subject disclosure will be readily appreciated as the same becomes better understood by reference to the following detailed description when considered in connection with the accompanying drawings wherein.

DETAILED DESCRIPTION OF THE DISCLOSURE

The present disclosure provides a method of recycling a plastic. The terminology "recycling" and "decomposing" may, in various non-limiting embodiments, be used interchangeably herein. The plastic of the present disclosure may be any plastic known in the art. The plastic may be a polymerization product of monomers including, but not limited to, aliphatic monomers, aromatic monomers, and combinations thereof. The plastic may be a polymerization product of monomers including unsaturated monomers such as alkenes and dienes having carbon-carbon double bonds, alkynes having carbon-carbon triple bonds, and styrene monomers. The plastic may be recyclable according to the Recycling Codes developed by the American Plastics Council. Prior to recycling, the plastic may be found in commercial products including, but not limited to, containers, packaging, insulation, construction products, and combinations thereof. However, it is contemplated that the plastic may be in any form.

In one embodiment, the plastic is selected from the group of polyethylene, polypropylene, polystyrene, and combinations thereof. Polypropylene corresponds to Recycling Code 5 and can traditionally be found in food containers, medicine bottles, etc. Polystyrene (PS) corresponds to Recycling Code 6 and can typically be found in compact disc jackets, food service applications, food trays, egg cartons, pharmaceutical containers, cups, plates, cutlery, and the like.

In another embodiment, the polyethylene is selected from the group of low density polyethylene (LDPE), which corresponds to Recycling Code 4, linear low density polyethylene (LLDPE), which may be classified under Recycling Code 7, high density polyethylene (HDPE), which corresponds to Recycling Code 2, and combinations thereof. Low density polyethylene may be found in dry cleaning products, in food storage bags and bottles, and the like. Linear low density polyethylene is typically found in liquid containers, food containers, etc. High density polyethylene is traditionally found in food, cosmetic, and detergent bottles, in storage containers, in cereal box liners, in grocery, trash and retail bags, etc. It is contemplated that the plastic may be atactic, isotactic, hemi-isotactic, or syndiotactic, as is known in the art. For descriptive purposes only, the chemical structures of polyethylene, polypropylene, and polystyrene are shown below:

Polyethylene　　Polypropylene　　Polystyrene wherein n may be any integer.

Also for descriptive purposes only, generic chemical structures of atactic, isotactic, and syndiotactic polypropylene are shown below:

wherein n may be any integer.

Before the plastic is decomposed, the method may include the steps of processing the plastic with physical and/or chemical treatments and introducing the plastic into a vessel. These steps are independent of each other and do not necessarily have to be performed in the method. It is contemplated that the steps of processing the plastic and introducing the plastic into the vessel, if included in the method, may occur in any order.

Typically, the plastic is processed with the physical and/or chemical treatments to ease introduction into the vessel. When processed with physical treatments, the plastic is typically cleaned to remove dirt, oil, grease, detergents, food, and exogenous plant and animal contaminants. The plastic may be cleaned with any method known in the art. Typically, the plastic is cleaned using pressurized water jets, floatation, surfactants, scrubbers and the like, and combinations thereof. The plastic may also be reduced in size through any method known in the art including, but not limited to, shredding, grinding, heating, melting, burning, smashing, dissolving, tearing, crushing, and combinations thereof. The plastic may be reduced to any size including, but not limited to, powder. The plastic may also be physically treated through stirring, mixing, sonicating, through use of radiowaves, magnetic energy, and light energy, and combinations thereof. The plastic may also be treated with the chemical treatments including combination with catalysts, enzymes, fillers, acids, bases, salts, cationic and anionic compounds, processing agents, and combinations thereof. Most typically, the plastic is cleaned, shredded, and melted into a molten state.

It is to be understood that melting the plastic into a molten state may or may not decompose the plastic depending on temperature and rate of heating. The plastic may be heated at any rate and to any temperature. In one embodiment, the plastic is heated to a temperature of from 75° C. to 250° C., more typically of from 100° C. to 200° C., and most typically of from 150° C. to 200° C., to melt the plastic. In yet another embodiment, the plastic is heated to a temperature of 150° C. to melt the plastic. In another embodiment, the plastic is typically heated at a rate of from 10 to 1000, more typically of from 50 to 500, and most typically of from 100 to 200° C./second, to melt the plastic. It is contemplated that the plastic may be melted in one or more heated vessels.

Referring now to the optional step of introducing the plastic into the vessel, the plastic may be introduced into the vessel in any setting and in any amount. The plastic may be introduced into the vessel in laboratories on a gram and smaller scale and in industrial recycling facilities on a kilogram to kiloton and larger scale. The vessel may be any vessel known in the art and may include one or more laboratory and/or industrial size vessels. In one embodiment, the plastic is continuously fed into the vessel for decomposition, thereby making the method of the instant disclosure continuous. It is also contemplated that the method may be performed batch-wise, i.e., discontinuously.

The vessel may be a reactor. The reactor may be any reactor known in the art including, but not limited to, continuous screw reactors, plug reactors, and combinations thereof. In one embodiment, the reactor includes both a continuous screw reactor and a plug reactor. The reactor may also be operated in any type of mode including, but not limited to, batch and continuous modes, as first introduced above. Typically, the reactor is operated in continuous mode to reduce energy consumption, operating costs, size of the reactor, running time, and down time. The reactor may further be operated at any temperature. In one embodiment, the reactor is heated discontinuously from room temperature to a desired temperature for every cycle of the method. In another embodiment, the reactor is heated to the desired temperature and continuously maintained at the desired temperature. Typically, the reactor is heated to a temperature of from 100° C. to 600° C., more typically of from 400° C. to 600° C., and most typically of from 350° C. to 450° C.

Referring now to the step of decomposing the plastic, the plastic is typically decomposed in the vessel. The plastic may be decomposed by any method known in the art including, but not limited to, heating, actinic and microwave radiation, and combinations thereof. It is contemplated that the temperature of decomposition may be the same as the aforementioned temperatures for melting the plastic or may be different. Typically, the plastic is decomposed at a temperature of from 100° C. to 600° C., more typically of from 400° C. to 600° C., and most typically of from 350° C. to 450° C.

In one embodiment, the step of decomposing the plastic includes the step of pyrolyzing the plastic. As is known in the art, pyrolysis includes rapid heating of the plastic, i.e., heating the plastic at a rate of at least 50° C./sec, to at least partially reverse polymerize the plastic and form the hydrocarbons. In another embodiment, the step of decomposing the plastic includes the step of thermolyzing the plastic. As is also known in the art, thermolysis includes gradual heating of the plastic, i.e., heating the plastic at a rate of at least 1° C./sec, to at least partially reverse polymerize the plastic and form the hydrocarbons.

In one embodiment, the method includes the step of introducing a catalyst 10 into the vessel as. Typically, the catalyst 10 is introduced into the vessel after the plastic is introduced into the vessel and as the plastic is decomposing. The catalyst 10 may be introduced into the vessel in a solid, liquid, or gaseous state, or in a combination of states. The plastic may be decomposed in the presence of from 0.1 part of the catalyst per one million parts of the plastic to 100 parts of the catalyst per 100 parts of the plastic. Alternatively, the plastic may be decomposed in the presence of from 1 part of the catalyst per one million parts to 100 parts of the catalyst per 100 parts of the plastic, from 10 parts of the catalyst per one million parts to 100 parts of the catalyst per 100 parts of the plastic, from 100 part of the catalyst per one million parts to 100 parts of the catalyst per 100 parts of the plastic, or from 1000 parts of the catalyst per one million parts to 100 parts of the catalyst per 100 parts of the plastic. Alternatively, the plastic may be decomposed in the presence of from 0.01 to 100, 0.1 to 100, 1 to 100, 10 to 90, 20 to 80, 30 to 70, or 40 to 60 parts of the catalyst per 100 parts of the plastic.

The method includes decomposing the plastic in the presence of the catalyst 10 to form hydrocarbons. The catalyst 10 includes a porous support 12, a depolymerization catalyst component A, and a reducing catalyst component B, as shown in FIGS. 1-4. The plastic is typically decomposed in the presence of the catalyst 10 to form one or more hydrocarbons. The one or more hydrocarbons typically each independently have 4 to 40, 5 to 39, 6 to 38, 7 to 37, 8 to 36, 9 to 35, 10 to 34, 11 to 33, 12 to 32, 13 to 31, 14 to 30, 15 to 29, 16 to 28, 17 to 27, 18 to 26, 19 to 25, 20 to 24, 21 to 23, or 22 to 23, carbon atoms (carbons), or any combination thereof. In one embodiment, the hydrocarbons each have from 4 to 40 carbons. In other embodiments, the hydrocarbons have from 5 to 25 carbons. In some embodiments, the hydrocarbons have from 11 to 25 carbons. It is to be appreciated the terminology set forth above describe a number of carbon atoms typically describes a molecular distribution of the hydrocarbons formed or the total number of carbon atoms in each of the one or more hydrocarbons. In various embodiments, the plastic is depolymerized in the presence of the depolymerization catalyst component A to form hydrocarbons, e.g. having 5 to 25 carbons. More specifically, in certain embodiments, the plastic is depolymerized in the presence of the depolymerization catalyst component A to form unsaturated hydrocarbons having, e.g. 5 to 25 carbons.

In other embodiments, the unsaturated hydrocarbons having, e.g. 5 to 25 carbons, are reduced in the presence of the reducing catalyst component B to form saturated hydrocarbons having 5 to 25 hydrocarbons. Without reducing the unsaturated hydrocarbons in the presence of the reducing catalyst component B, the unsaturated hydrocarbons may undesirably continue to depolymerize in the presence of the depolymerization catalyst component A. Typically, hydrocarbons having 5 to 25 carbons are suitable for use as/in diesel fuel. In contrast, hydrocarbons having 5 to 10 carbons are typically suitable for use as/in gasoline. Typically, the depolymerization catalyst component A and the reducing catalyst component B cooperate to decompose the plastic. In various embodiments, if gasoline fuel is a desired output or result, the molecular distribution for the hydrocarbons formed may be from 4 to 16, from 5 to 11, or from 5 to 10 carbons. In other embodiments, if diesel fuel is a desired output or result, the molecular distribution for the hydrocarbons formed may be from 5 to 35, from 10 to 30, or from 11 to 24 carbons. In one embodiment, the diesel fuel is further defined as light diesel fuel and has a cetane value of from 42 to 55.

Referring back to the porous support 12, the porous support has an exterior surface 14 and defines at least one pore 16 therein, as shown in FIGS. 1-4. The porous support 12 may have or be any structure known in the art including a crystalline or an irregular structure. In addition, the at least one pore 16 may be defined uniformly or randomly throughout the porous support 12. In various embodiments, the porous support 12 includes two or a plurality of pores 16 wherein each pore 16 independently has a uniform or irregular structure. Any one pore may have a structure that is the same or different from the structure of any other pore. The at least one pore 16 typically extends into the porous support 12, and may extend through the porous support 12, or a combination thereof. Typically, the porous support 12 has a crystalline structure wherein the plurality of pores 16 may be defined and/or disposed uniformly or heterogeneously or randomly through or on or in the porous support 12. The porous support 12 may be further defined as a molecular sieve, clay, glass, ceramic, charcoal, silica gel, or sol-gel. In various embodiments, the porous support 12 is further defined as a molecular sieve.

Typically, the at least one pore 16 has a pore size of from 3 to 20, from 3 to 12, from 3 to 6 angstroms (Å). Alternatively, the at least one pore 16 has a pore size of from 3 to 19, from 4 to 18, from 5 to 17, from 6 to 16, from 7 to 15, from 8 to 14, from 8 to 13, from 9 to 12, from 9 to 11 Å. The pore size may be alternatively described as any value, or range of values, both whole and fractional, within or between any one or more values described above. In various embodiments, the aforementioned pore size may vary by ±1, 2, 3, 4, 5, 6, 7, 8, 9, 10, 15, 20, 25, 30, etc. %. Without intending to be bound by any particular theory, it is believed that the pore size contributes to the decomposition of the hydrocarbons because the at least one pore 16 permits hydrocarbons of particular molecular weight and/or sizes into the at least one pore 16 thereby preventing or minimizing further depolymerization, as described in detail below. A non-limiting example of a suitable molecular sieve is a 13X molecular sieve. The 13X molecular sieve has a pore size of about 10 Å.

In other embodiments, the molecular sieve is further defined as a zeolite. Zeolites are hydrated silicates of aluminum and may include sodium and/or calcium. One common chemical formula of zeolites is $Na_2 \cdot Al_2O_3 \cdot xSiO_2 \cdot xH_2O$. Suitable non-limiting examples of zeolites include AFG, IFR, OFF, ABW, ACO, SAO, ASV, ISV, OSO, AET, AEI, SAS, BEA, ITE, PAR, AFI, AEL, SAT, BIK, JBW, PAU, AFX, AEN, SAV, BOG, KFI, RON, ANA, AFN, SBE, BRE, LIO, RSN, AST, AFO, SBS, CAS, LOV, RTE, BPH, APR, SBT, CFI, LTN, RTH, CAN, AFS, VFI, CHI, MAZ, RUT, CGS, AFT, WEI, CON, MEI, SFE, CHA, AFY, ZON, DAC, MEL, SFF, DFT, AHT, DDR, MEP, SGT, EDI, APC, DOH, MFI, STF, ERI, APD, DON, MFS, STI, FAU, ATN, EAB, MON, STT, GIS, ATO, EMT, MOR, TER, LAU, ATS, EPI, MSO, TON, LEV, ATT, ESV, MTF, TSC, LOS, ATV, EUO, MTN, VET, LTA, AWO, FER, MTT, VNI, LTL, AWW, FRA, MTW, VSV, MER, CGF, GME, MWW, WEN, PHI, CLO, GON, NAT, YUG, RHO, CZP, GOO, NES, SOD, DFO, HEU, NON, THO, OSI, ZSM, and combinations thereof. A non-limiting example of a suitable zeolite is a ZSM 34 zeolite. The ZSM 34 zeolite has a pore size of about 5 Å.

Referring back, the depolymerization catalyst component A is disposed on the exterior surface 14 of the porous support 12 for depolymerizing the plastic to form the hydrocarbons. More specifically, the depolymerization catalyst component A may be disposed on and in direct contact with, or on and spaced apart from, the exterior surface 14 of the porous support 12. In certain embodiments, the depolymerization catalyst component A may be disposed on and in direct contact with, or on and spaced apart from, the exterior surface 14 and the depolymerization catalyst component A may be disposed in and in direct contact with, or in and spaced apart from, an interior of the at least one pore 16 of the porous support 12. Said differently, the depolymerization catalyst component A may be disposed both on the exterior surface 14 of the porous support and simultaneously in the at least one pore 16 of the porous support 12.

The depolymerization catalyst component A includes or is a Ziegler-Natta catalyst, a Group IIA oxide catalyst, or a combination thereof. As described above, the plastic is typically depolymerized in the presence of the depolymerization catalyst component A to form the hydrocarbons. In some embodiments, the depolymerization catalyst component A is further defined as a Ziegler-Natta catalyst. For example, the Ziegler-Natta catalyst may be or include one or more heterogeneous supported catalysts such as $TiCl_3$ supported on $MgCl_2$ and homogenous catalysts such as metallocene catalysts and non-metallocene catalysts. Typically, a metallocene catalyst is or includes a metal atom such as Ti, Zr, or Hf complexed with two organic ligands. Typically, a non-metallocene catalyst includes various metal atoms complexed with a variety of ligands with the ligands including oxygen, nitrogen, phosphorus, and/or sulfur.

In various other embodiments, the Ziegler-Natta catalyst is further defined as a metallocene catalyst. Although the exact mechanism of depolymerizing the plastic in the presence of the metallocene catalyst is not known, the mechanism is likely influenced by kinetic, thermodynamic, electronic, and/or steric interactions of the plastic and the metallocene catalyst and may utilize a type of reverse-Arlman-Cossee mechanism to depolymerize the plastic. Without intending to be limited by any particular theory, it is believed that the mechanism involves coordination of carbon atoms in the plastic with the metal atom of the metallocene catalyst involving pi bonding- and anti-bonding-orbitals of the carbon atoms and d-orbitals of the metal atom.

The metallocene catalyst may be chiral or achiral, may be symmetric or asymmetric, and may be homogeneous or heterogeneous. The metallocene catalyst may include any organic or inorganic moieties known in the art. The terminology "metallocene catalyst" includes both metallocene and post-metallocene catalysts. As is known in the art, metallocenes are organometallic coordination compounds that include cyclopentadienyl derivatives of a transition metal or metal halide, i.e., a constrained metal site is sterically hindered due to orientation between two pi-carbocyclic ligands. Three non-limiting examples of suitable metallocenes include dicyclopentadienyl-metals having the general formula $(C_5H_5)_2M$, dicyclopentadienyl-metal halides having the general formula $(C_5H_5)_2MX_{1-3}$, and monocyclopentadienyl-metal compounds with the general formula $(C_5H_5)_2MR_{1-3}$, wherein X is a halogen and R is an organic moiety. When the two pi-carbocyclic ligands are unbridged, the metallocene is non-stereorigid and typically has $C_2v$ symmetry, i.e., the metallocene has a plane of symmetry. When the two pi-carbocyclic ligands are bridged, a stereorigid metallocene, also known as an ansa metallocene, is formed and typically has $C_1$, $C_2$, or $C_s$ symmetry, wherein a $C_s$ symmetric molecule has a plane of symmetry and is not chiral. In one embodiment, the plastic is atactic and the metallocene catalyst is an achiral $C_2v$ symmetric metallocene. In another embodiment, the plastic is hemi-isotactic and the metallocene catalyst is a $C_1$ symmetric metallocene. In yet another embodiment, the plastic is isotactic and the metallocene catalyst is a chiral $C_2$ symmetric metallocene. In a further embodiment, the plastic is syndiotactic and the metallocene catalyst is a $C_s$ symmetric metallocene.

In other embodiments, the metallocene catalyst is selected from the group of Kaminsky catalysts, Brintzinger catalysts, Ewen/Razavi catalysts, and combinations thereof. In these other embodiments, the metallocene catalyst is or includes a Kaminsky catalyst.

As is known in the art, Kaminsky and Brintzinger catalysts are based on metallocenes of Group IV transition metals and include halogens. These metallocene catalysts are typically homogeneous. For descriptive purposes only, generic chemical structures of Kaminsky and Brintzinger catalysts are shown below:

wherein M is typically a Group IV transition metal including, but not limited to, titanium, zirconium, hafnium, and X is typically a halogen.

In certain embodiments, the metallocene catalyst includes zirconium. In various embodiments, the metallocene catalyst including zirconium is further defined as bis(cyclopentadienyl)zirconium(IV). In other embodiments, the metallocene catalyst is or includes dichlorobis(2-methylindenyl) zirconium (IV). In yet other embodiments, the metallocene catalyst is dichlorobis(2-methylindenyl)zirconium (IV), which has a chemical formula of $C_{20}H_{18}Cl_2Zr$, a molecular weight of 420.49 grams/mole, and a CAS number of 165688-64-2, and is commercially available from Sigma Aldrich Corporation of St. Louis, Mo. For descriptive purposes only, a chemical structure of dichlorobis(2-methylindenyl)zirconium (IV) is shown below:

As is also known in the art, Ewen/Razavi catalysts are similar to Kaminsky and Brintzinger catalysts. These catalysts are also typically homogeneous. For descriptive purposes only, a common chemical structure of a Ewen/Razavi catalyst are shown below:

wherein M is typically a Group IV transition metal, E is typically selected from the group of carbon and silicon, and R' and R" may each independently include any organic moiety and may be the same or may be different.

The post-metallocene catalysts are typically homogeneous single-site systems, such that catalytic properties can be controlled by modification of the structure of the post-metallocene catalyst. Many post-metallocene catalysts include early transition metals. However, late transition metals may also be included such as nickel, palladium, iron, or combinations thereof. Non-limiting examples of post-metallocene catalysts that are suitable for use as the depolymerization catalyst component A are Brookhart, Grubbs, and Fujita catalysts. For descriptive purposes only, common chemical structures of the Brookhart, Grubbs, and Fujita catalysts are shown below:

Brookhart Catalyst

Grubbs Catalyst

Fujita Catalyst wherein R may be any organic or inorganic moiety known in the art.

For descriptive purposes only, the depolymerization of polyethylene, polypropylene, and polystyrene, in the presence of the metallocene catalyst and heat, is shown below in three separate reaction schemes:

wherein n may be any integer and typically is from 1 to 40.

In other embodiments, the depolymerization catalyst component A is or includes a Group IIA oxide catalyst. The Group IIA oxide catalyst may be or include one or more oxides of beryllium, magnesium, calcium, strontium, barium, radium, or combinations thereof. In certain embodiments, the Group IIA oxide catalyst is further defined as magnesium oxide, calcium oxide, barium oxide, and/or combinations thereof. Typically, the Group IIA oxide is further defined as barium oxide.

In various embodiments, the depolymerization catalyst component A includes molecules with customizable alkaline and acidic sites. If the depolymerization catalyst component A includes alkaline and acidic sites in the same molecule, the alkaline and acidic sites may be in the form of aluminum titanates, mixture of aluminum hydroxides or oxides, titanium oxides, titania, alkali or alkaline metal titanate, or combinations thereof. Specifically, the depolymerization catalyst component A may include the aluminum and titanium oxides with varying ratios of acidity and alkalinity.

Referring back, the reducing catalyst component B is disposed in the at least one pore 16 for reducing the hydrocarbons. More specifically, the reducing catalyst component B may be disposed in and in direct contact with, or in and spaced apart from, an interior of the at least one pore 16 of the porous support 12. The reducing catalyst component B may be any reducing catalyst known in the art. As described above, the hydrocarbons are typically reduced in the presence of the reducing catalyst component B in the at least one pore 16 of the porous support 12. It is believed that the hydrocarbons which can enter the at least one pore 16 of the porous support 12 are reduced. Once the hydrocarbons enter the at least one pore 16, the hydrocarbons may be reduced which may result in the termination of the depolymerization of the hydrocarbons within the at least one pore 16. By controlling the pore size of the at least one pore 16, the molecular distribution of the hydrocarbons may be controlled. For example, the catalyst 10 for decomposing the plastic having a pore size of 10 Å may form hydrocarbons having 5 to 25 carbon which are suitable for use as diesel fuel while the catalyst 10 for decomposing the plastic having a pore size of 5 Å may form hydrocarbons having a lower molecular distribution which are suitable for use as gasoline fuel.

The reducing catalyst component B may be or include mono- and/or di-hydride catalysts, and/or metallic catalysts including, but not limited to, platinum, palladium, nickel, rhodium, ruthenium, iridium, titanium, and combinations thereof. In certain embodiments, the reducing catalyst component B is or includes a transition metal catalyst. The transition metal catalyst may be or include a transition metal selected from the group of iron, nickel, palladium, platinum, and combinations thereof.

In various embodiments, the reducing catalyst component B is or includes a Group IA hydride catalyst, a Group IIA hydride catalyst, or a combination thereof. The Group IA hydride catalyst may be or include lithium aluminum hydride (LAH), sodium hydride, or a combination thereof. The Group IIA hydride catalyst may be or include magnesium hydride, calcium hydride, or a combination thereof.

In other embodiments, the reducing catalyst component B is selected from the group of Wilkinson's catalyst, Crabtree's catalyst, and combinations thereof. For descriptive purposes only, the chemical structures of Wilkinson's and Crabtree's catalysts are shown below:

Wilkinson's Catalyst    Crabtree's Catalyst

For descriptive purposes only, the reaction of the reducing catalyst component B with the hydrocarbons is shown below in three separate reaction schemes:

wherein n may be any integer.

In certain embodiments, the exterior surface 14 is substantially free of the reducing catalyst component B and/or the at least one pore 16 is substantially free of the depolymerization catalyst component A. The terminology "substantially free of the reducing catalyst" describes an amount of the reducing catalyst component B on the exterior surface 14 of less than 10, less than 5, or less than 1 part(s) by weight based on 100 parts by weight of the depolymerization catalyst component A on the exterior surface 14. The terminology "substantially free of the depolymerization catalyst" describes an amount of the depolymerization catalyst component A in the at least one pore 16 of less than 10, less than 5, or less than 1 part(s) by weight based on 100 parts by weight of the reducing catalyst component B in the at least one pore 16. In other embodiments, the reducing catalyst component B is different from the depolymerization catalyst component A.

The catalyst 10 for decomposing the plastic may also include, and/or be utilized with, a reducing agent. The reducing agent may react with the hydrocarbons and acts in concert with the reducing catalyst component B to reduce any hydrocarbons having carbon-carbon double and triple bonds to hydrocarbons having carbon-carbon single bonds, i.e., saturated monomers or hydrocarbons. The reducing agent may be any reducing agent known in the art and typically includes hydrogen gas ($H_2$), metal hydrides catalyzed by transition metals, and combinations thereof. Typically, the reducing agent includes $H_2$ modified with nitrogen gas ($N_2$) added as a gas stream to aid in eventual removal of the monomers. The reducing agent may react in a symmetrical or asymmetrical manner and in a directed or non-directed manner.

The catalyst 10 for decomposing the plastic may also include and/or be utilized with one or a plurality of co-catalysts. The co-catalyst is typically utilized to increase catalyst functionality and efficiency. If the co-catalyst is included, the co-catalyst is selected from the group of methylaluminoxane, alumoxane, alkylaluminums such as trimethylaluminum and triethylaluminum, and halo-alkyls such as diethylaluminum chloride, diethylaluminum bromide, diethylaluminum iodide, and combinations thereof. Additionally, if the co-catalyst is included, the co-catalyst may be present in any amount. In various embodiments, the co-catalyst is present in an amount of less than or equal to 100, less than or equal to 50, or less than or equal to 10, parts by weight based on 100 parts by weight of the depolymerization catalyst component A.

The catalyst 10 for decomposing the plastic may further include and/or be utilize one or more of a plurality of modifiers. It is contemplated that the modifier may be added to the depolymerization catalyst and/or the co-catalyst. Although any modifier known in the art may be used, typically, the modifier is selected from the group of carboxylic acid esters, amines, cycloalkyltrienes, fluoride ions, ethers, ketones, phosphines, organophosphates, and combinations thereof. The modifier is typically added to the catalyst 10 and/or co-catalyst to increase catalyst functionality and efficiency. If the modifier is included, the modifier is typically present in an amount of less than or equal to 100, more typically of less than or equal to 50, and most typically of less than or equal to 10, parts by weight per 100 parts by weight of the depolymerization catalyst component A.

The method may also include the step of introducing the reducing agent, different from the reducing catalyst component, into the vessel and/or reducing the hydrocarbons in the presence of the reducing agent. The reducing agent is typically selected from the group of hydrogen gas ($H_2$), metal hydrides catalyzed by transition metals, and combinations thereof, but may be any known in the art. In one embodiment, the reducing agent includes $H_2$. In another embodiment, the reducing agent includes $H_2$ modified with nitrogen gas ($N_2$) added as a gas stream to the vessel to aid in eventual removal of the hydrocarbons from the vessel. The reducing agent may react with the plastic alone, with the hydrocarbons, with the catalyst 10, with the depolymerization catalyst component A and/or with the reducing catalyst component B. The reducing agent may react in a symmetrical or asymmetrical manner and in a directed or non-directed manner. The reducing agent may be added to the vessel in any amount and at any pressure. The reducing agent typically reacts with the hydrocarbons and acts in concert with the catalyst 10 to at least partially reduce hydrocarbons having carbon-carbon double and triple bonds to hydrocarbons having carbon-carbon single bonds, i.e., saturated hydrocarbons. The reducing agent may be added at any point in the method. Typically, the reducing agent is added to the vessel after the plastic has been added to the vessel and the plastic is decomposed to at least partially form the hydrocarbons. In one embodiment, the catalyst 10 and the reducing agent are present together in the vessel and act synergistically to depolymerize the plastic and reduce the hydrocarbons simultaneously. Typically, the reducing agent is added in an amount of from 0.5 to 5, more typically of from 0.6 to 2, and most typically of from 0.7 to 1, moles, per one mole of the plastic. Typically, the reducing agent is added at a pressure of from 1 to 20, more typically of from 1 to 10, and most typically of from 1 to 2, atmospheres.

In certain embodiments, the plastic is decomposed in the presence of from 0.1 part of the catalyst per one million parts of the plastic to 100 parts of the catalyst per 100 parts of the plastic, wherein the depolymerization catalyst is bis(cyclopentadienyl)zirconium(IV), wherein the reducing catalyst is palladium, wherein the porous support is further defined as 13X molecular sieve, and wherein the method further includes the step of reducing the hydrocarbons in the presence of hydrogen gas.

In addition to the aforementioned steps, the method may also include the step of monitoring the formation of the hydrocarbons. The hydrocarbons may be monitored online, offline, or through a combination of both online and offline monitoring. Also, the step of monitoring may include utilizing any monitoring technique known in the art. The monitoring technique may include, but is not limited to, spectroscopy, and chromatography. The spectroscopy may include mass, infrared, atomic emission, atomic absorption, nuclear magnetic resonance, Ramen, fluorescence, x-ray, atomic fluorescence, plasma emission, direct-current plasma, inductively-coupled plasma, laser induced breakdown, laser-induced plasma, microwave-induced plasma, spark and/or arc, UV, photoemission, force, dielectric, circular dichroism, rotational, vibrational, rigid rotor, EPR, spectral power distribution, metamerism, spectral reflectance, acoustic, dynamic mechanical, electron energy loss, and Auger electron, spectroscopies, and combinations thereof. The chromatography may include gas, liquid, ion-exchange, affinity, thin layer, supercritical fluid, and column, chromatographies, and combinations thereof. In one embodiment, the step of monitoring includes a combination of gas chromatography and mass spectroscopy.

It is also contemplated that the method may include the step of purifying the hydrocarbons. The hydrocarbons may be purified by any method known in the art. In one embodiment, the hydrocarbons are distilled to increase purity and separate the hydrocarbons from any residue of the decomposed plastic. In another embodiment, the hydrocarbons having from 4 to 40 carbon atoms are distilled to separate fractions of hydrocarbons having from 4 to 14 carbon atoms and/or fractions of hydrocarbons having from 11 to 25 carbon atoms. It is contemplated that the hydrocarbons having from 4 to 14 carbon atoms and/or the hydrocarbons having from 11 to 25 carbon atoms may include gasoline, diesel fuel, or a combination thereof that can be directly sold at commercial gas stations and used in automobiles.

The method may further include the step of adding an octane increasing agent to the plastic and/or hydrocarbons. The octane increasing agent may be any octane increasing agent known in the art including, but not limited to, aromatic hydrocarbons. Typically, the octane increasing agent includes ethylbenzene from reduction of styrene from polystyrene. In one embodiment, there is sufficient ethyl benzene formed from the decomposition of the instant plastic such that the octane increasing agent does not need to be added to the hydrocarbons. In another embodiment, the octane increasing agent is typically added in an amount of less than or equal to 30, more typically of less than or equal to 20, and most typically of less than or equal to 10, parts by weight per 100 parts by weight of the plastic. It is to be understood that if the plastic includes polystyrene, the octane increasing agent may not need to be added or may be added in lesser amounts. After decomposition of the plastic, the hydrocarbons may be removed by boiling or with a stream of gas including, but not limited to, helium, neon, argon, krypton, xenon, nitrogen, hydrogen, and combinations thereof.

EXAMPLES

Inventive Example 1

A 0.4% solution of $PdCl_2$ is prepared by the dilution of 0.4 g of $PdCl_2$ in 100 g of solvent wherein the solvent includes water acidified with HCl such that the solvent is visibly clear. 50 ml of the 0.4% solution of $PdCl_2$ is combined with a 13X molecular sieve which includes an exterior surface and at least one pore. The 13X molecular sieve is present in an amount such that total pore volume of the 13X molecular sieve is more than 50 ml. This typically ensures that the 50 ml 0.4% solution of $PdCl_2$ impregnates the at least one pore through capillary action. The 13X molecular sieve combined with $PdCl_2$ is then dried for 24 hours at a temperature of 110° C. 0.5 g of sodium borohydride is then combined with 60 ml of water to form a sodium borohydride solution. The sodium borohydride solution is then combined with the dried 13X molecular sieve to reduce the $PdCl_2$ to Pd and then dispose the Pd in the at least one pore wherein the Pd is the reducing catalyst component thereby forming a 13X molecular sieve including the Pd. The 13X molecular sieve including Pd is then dried for 24 hours at a temperature of 110° C.

The at least one pore of the 13X molecular sieve including the Pd is then impregnated with 50 ml of water. 0.2 g of bis(cyclopentadienyl)zirconium(IV) (Zr) is combined with 150 ml of toluene to form a mixture. The mixture and the 13X molecular sieve including the Pd are combined, air dried for 12 hours, and then dried for 48 hours at 110° C. to dispose Zr, as the depolymerization catalyst component A, on the exterior surface thereby forming a 13X molecular sieve including the Zr disposed on the exterior surface and the Pd disposed in the at least on pore.

Inventive Example 2

A 0.4% solution of $PdCl_2$ is prepared by the dilution of 0.4 g of $PdCl_2$ in 100 g of solvent wherein the solvent includes water acidified with HCl such that the solvent is visibly clear. 50 ml of the 0.4% solution of $PdCl_2$ is combined with a 13X molecular sieve which includes an exterior surface and at least one pore. The 13X molecular sieve is present in an amount such that total pore volume of the 13X molecular sieve is more than 50 ml. This typically ensures that the 50 ml 0.4% solution of $PdCl_2$ impregnates the at least one pore through capillary action. The 13X molecular sieve combined with $PdCl_2$ is then dried for 24 hours at a temperature of 110° C. 0.5 g of sodium borohydride is then combined with 60 ml of water to form a sodium borohydride solution. The sodium borohydride solution is then combined with the dried 13X molecular sieve to reduce the $PdCl_2$ to Pd and then dispose the Pd in the at least one pore wherein the Pd is the reducing catalyst component thereby forming a 13X molecular sieve including the Pd. The 13X molecular sieve including Pd is then dried for 24 hours at a temperature of 110° C.

0.2 g of bis(cyclopentadienyl)zirconium(IV) (Zr) is combined with 100 ml of toluene and 150 ml of methyl ethyl ketone to form a mixture. The mixture and the 13X molecular sieve including the Pd are combined, air dried for 12 hours, and then dried for 24 hours at 110° C. to dispose Zr, as the depolymerization catalyst component on the exterior surface and in the at least one pore thereby forming a 13X molecular sieve including the Zr disposed on the exterior surface and in the at least one pore, and the Pd disposed in the at least one pore.

Comparative Example 1

The catalyst of Comparative Example 1 includes the same porous support as above but does not include the depolymerization catalyst component disposed on the exterior surface and the reducing catalyst component disposed in the at least one pore. Instead, bis(cyclopentadienyl)zirconium(IV), as the depolymerization catalyst component, is disposed on an exterior surface and in an at least one pore of a 13X molecular sieve. No reducing catalyst component is utilized to form Comparative Example 1.

More specifically, 0.2 g of bis(cyclopentadienyl)zirconium(IV) (Zr) is combined with 100 ml of toluene and 150 ml of methyl ethyl ketone to form a mixture. The mixture and a 13X molecular sieve are combined, air dried for 12 hours, and then dried for 24 hours at 110° C. to dispose Zr, as the depolymerization catalyst component on the exterior surface and in the at least one pore.

Decomposition of Plastics

After each of the catalysts of Example 1, Example 2, and Comparative Example 1 are formed, each is used to independently decompose a mixture of polyethylene and polypropylene (Recycling Codes 4 and 5). More specifically, the plastics for each example are cut into pieces and loaded into a heated vessel in the presence of the aforementioned catalysts. The plastics are exposed to a constant stream of nitrogen ($N_2$) and hydrogen ($H_2$) and heated to 450° C. At approximately 380° C., products from the decomposition of the plastics start to distill over.

At the end of the trial, the hydrocarbons are analyzed via GC/MS (gas chromatography/mass spectroscopy) to determine highest yield of the hydrocarbons recovered, highest yield and percent yield of the hydrocarbons recovered for hydrocarbons having 11-25 carbon atoms, and highest yield and percent yield of the hydrocarbons recovered for hydrocarbons having 5-10 carbon atoms. These yields are set forth in Table 1 below. The results of the GC analysis of Example 1, Example 2, and Comparative Example 1 are set forth in FIGS. 5, 6, and 7, respectively.

Figure 1:
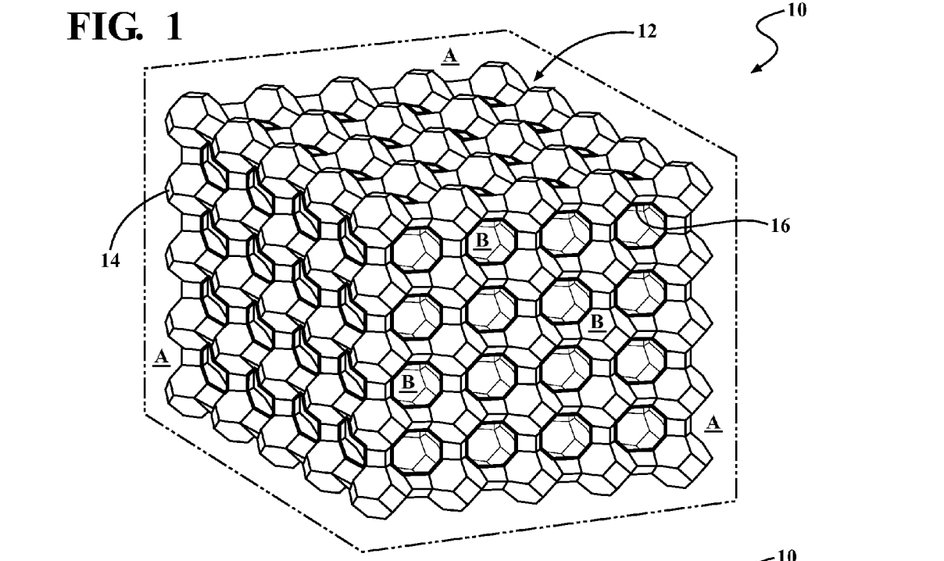
FIG. 1 is a perspective view of one embodiment of a catalyst including the porous support, the depolymerization catalyst component, and the reducing catalyst component.
Figure 2:
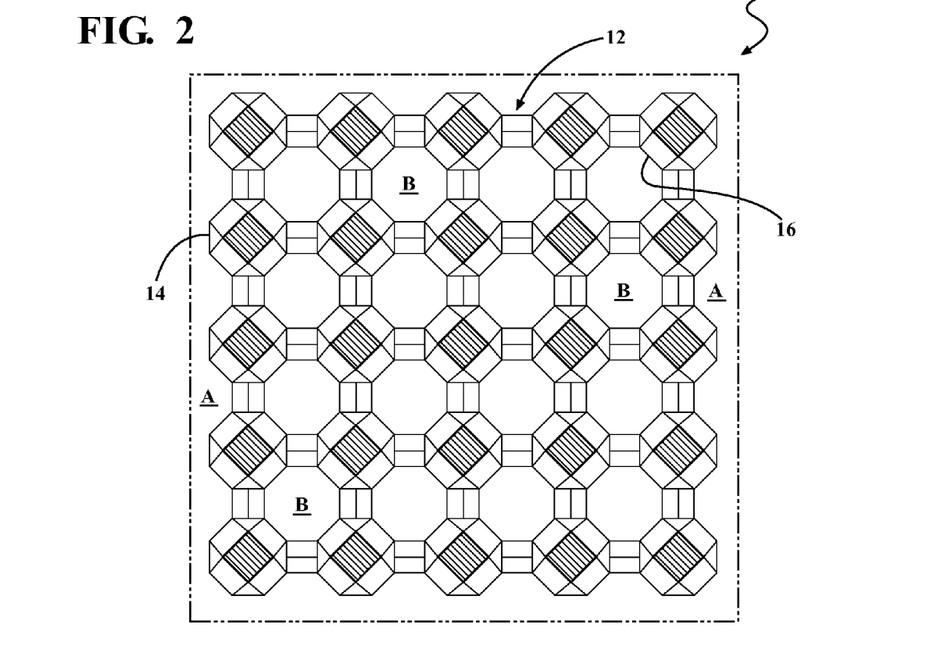
FIG. 2 is a cross-sectional view of one embodiment of the catalyst.
Figure 3:
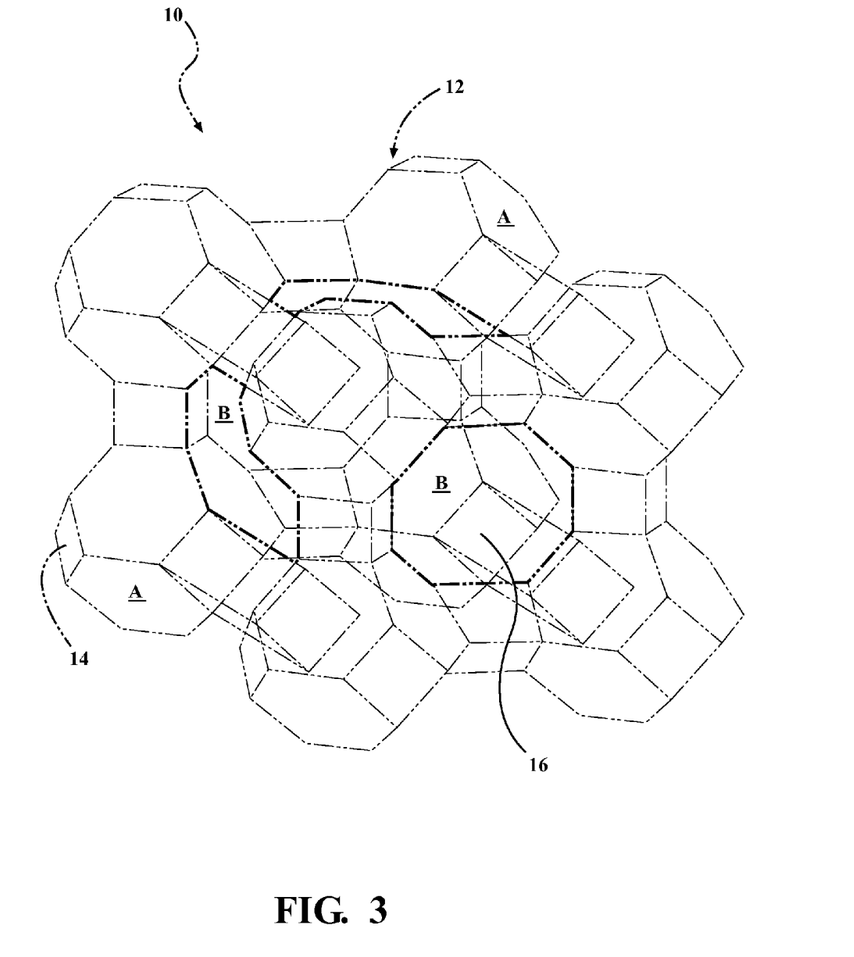
FIG. 3 is a perspective view of another embodiment of the catalyst.
Figure 4:
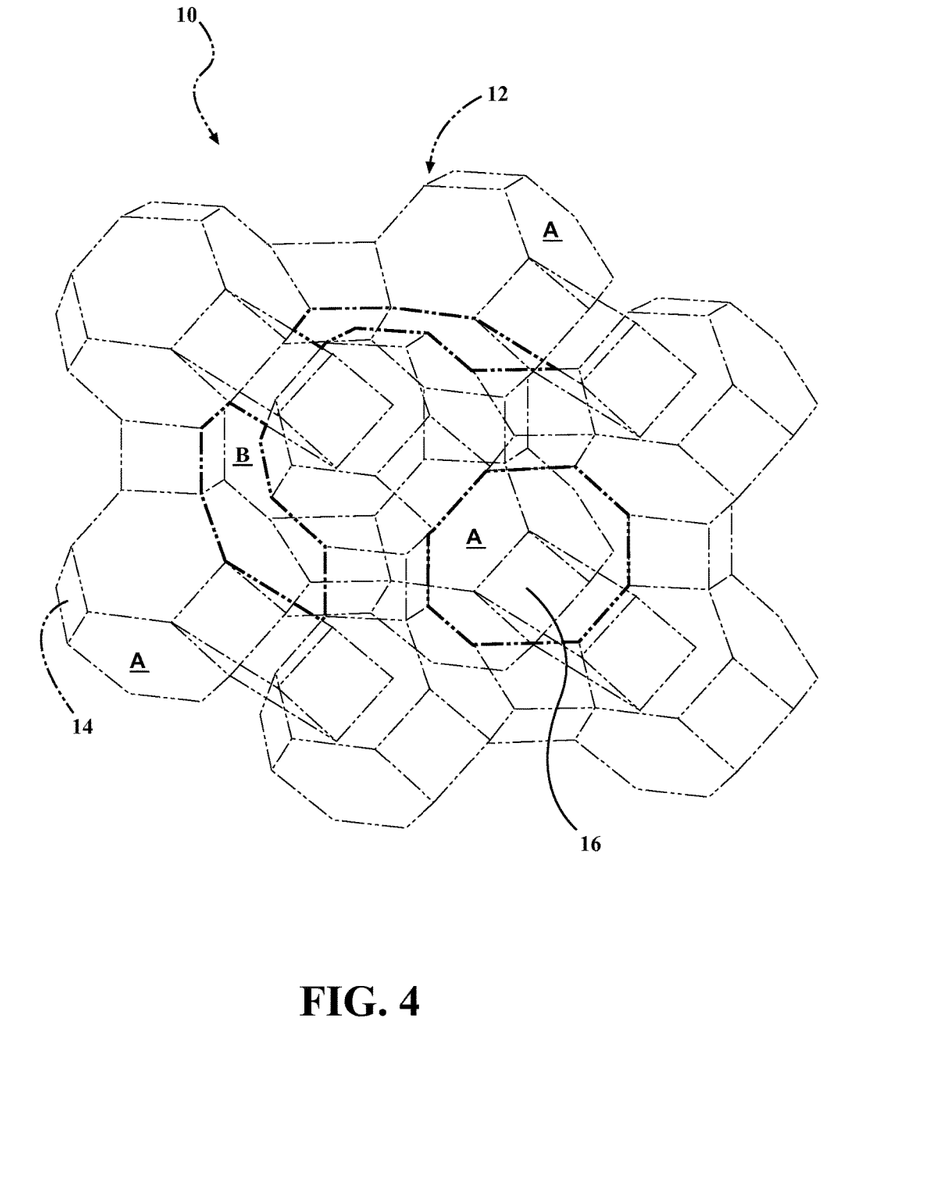
FIG. 4 is a is a perspective view of yet another embodiment of the catalyst.
Figure 5:
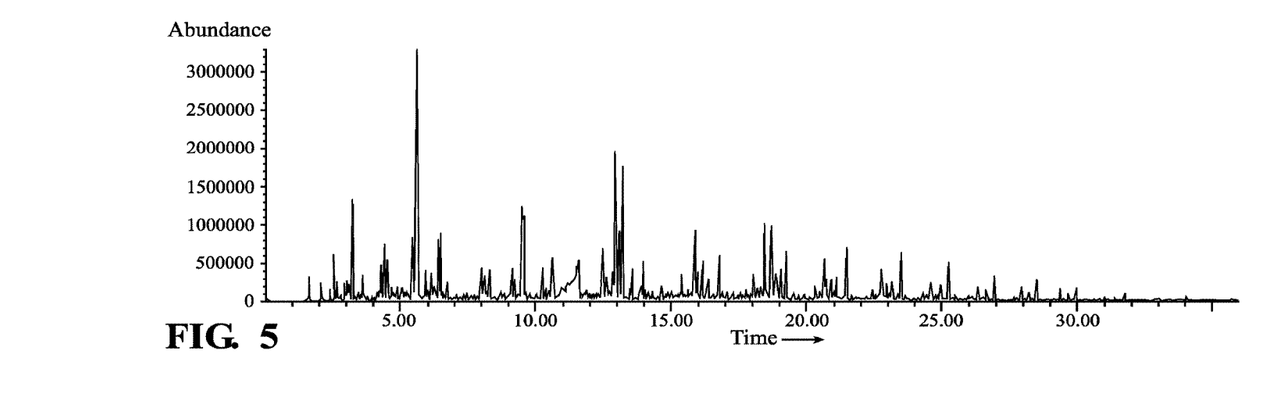
FIG. 5 is a gas chromatograph illustrating the relative quantities of a narrow spectrum of hydrocarbons formed from exposure of a plastic to one embodiment of the catalyst of this disclosure.
Figure 6:
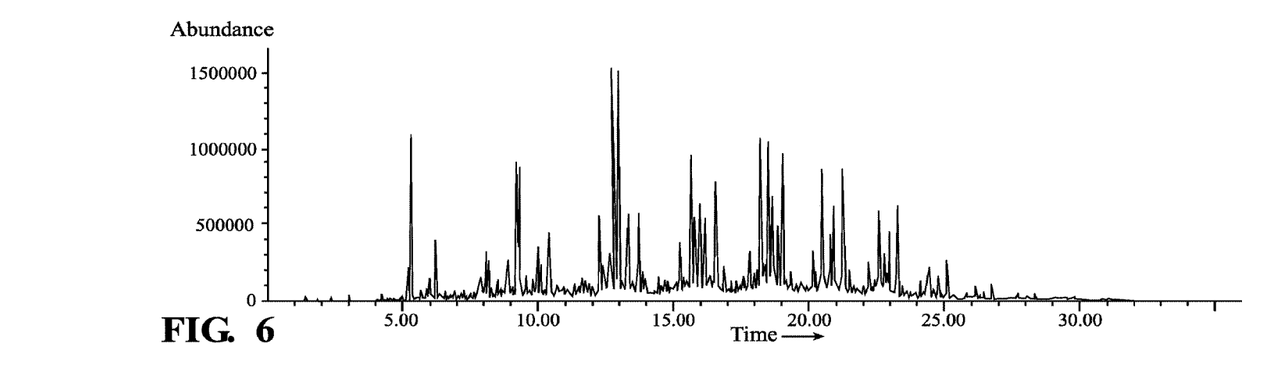
FIG. 6 is a gas chromatograph illustrating the relative quantities of a narrow spectrum of hydrocarbons formed from exposure of a plastic to another embodiment of the catalyst of this disclosure.
Figure 7:
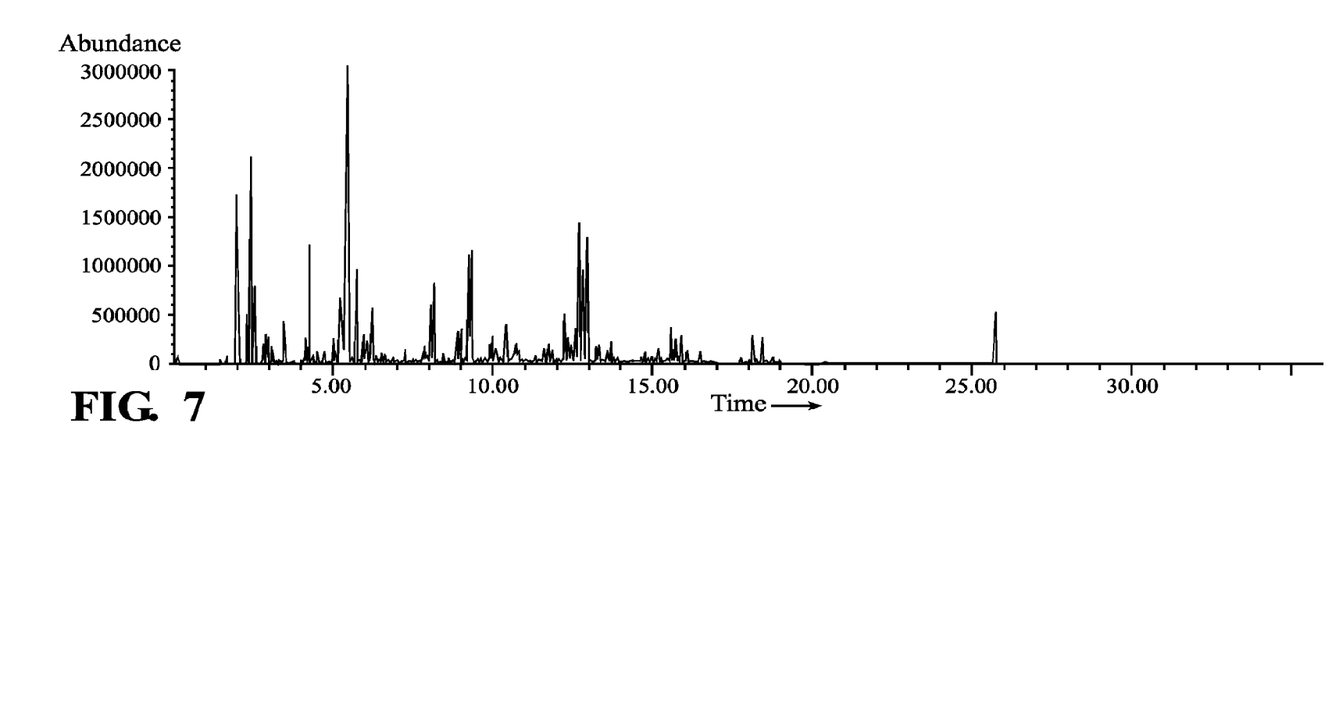
FIG. 7 is a gas chromatograph illustrating the relative quantities of a spectrum of hydrocarbons formed from exposure of a plastic to catalyst of the prior art.

As shown in Table 1, Inventive Example 1 with the Zr disposed on the external surface and the Pd disposed in the at least one pore generally provides for a higher molecular distribution than Comparative Example 1 with the Zr disposed on the external surface and in the at least one pore. Inventive Example 2 with the Zr disposed on the external surface and in the at least one pore, and the Pd disposed in the at least one pore, generally provides for a higher molecular distribution than both Comparative Example 1 and Inventive Example 1. More specifically, Inventive Examples 1 and 2 provides a higher yield of hydrocarbons having 11 to 25 carbon atoms than Comparative Example 1 and Inventive Example 2 provides a higher yield of hydrocarbons having 11 to 25 carbon atoms than Inventive Example 1. As described previously, diesel fuel typically includes hydrocarbons having 11 to 25 carbon atoms. Without intending to be bound by any particular theory, it is believed that the Zr and the Pd in the at least one pore of Inventive Example 2 cooperate synergistically thereby increasing yield of hydrocarbons having 11 to 25 carbon atoms during decomposition of the plastic.

TABLE 1

| | Example 1 | Example 2 | Comparative Example 1 |
|---|---|---|---|
| Porous Support | 13X Molecular Sieve | 13X Molecular Sieve | 13X Molecular Sieve |
| Catalyst in Pore | Pd | Zr and Pd | Zr |
| Catalyst on Surface | Zr | Zr | Zr |
| Reducing Agent | $H_2$ | $H_2$ | $H_2$ |
| High Hydrocarbons | C9, C12, C14, C16, C18, C20, C22 | C12, C14, C16, C18, C20, C22, C24 | C5, C6, C9, C12, C14 |
| Highest Hydrocarbons ($C_5$-$C_{10}$) | C8-C9 | C9 | C5-C9 |
| Highest Hydrocarbons ($C_{11}$-$C_{25}$) | C12-C24 | C12-C12 | C11-C18 |
| Percent Gasoline ($C_5$-$C_{10}$) | 52 | 5 | 59 |
| Percent Diesel ($C_{11}$-$C_{25}$) | 48 | 95 | 41 |

It is contemplated that, in one or more non-limiting embodiments, one or more compounds, chemistries, method steps, components, etc., as described in the concurrently filed PCT Application PCT/U.S. Ser. No. 12/71291, the entirety of which is expressly incorporated herein by reference, may be utilized.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. A method of recycling a plastic chosen from polyethylene, polypropylene, polystyrene, and combinations thereof, said method comprising: decomposing the plastic in the presence of a catalyst to form hydrocarbons and reducing the hydrocarbons in the presence of a reducing agent that is different from the catalyst, wherein the catalyst comprises a porous support having an exterior surface and at least one pore therein, a depolymerization catalyst component comprising a metallocene catalyst disposed on the exterior surface of the porous support, and a reducing catalyst component disposed in the at least one pore;

wherein the exterior surface of the porous support comprises less than 10 parts by weight of the reducing catalyst component based on 100 parts by weight of the depolymerization catalyst component as determined using Energy Dispersive X-Ray Spectroscopy (EDS), wherein the reducing catalyst component comprises a transition metal selected from the group of iron, nickel, palladium, platinum, and combinations thereof, and wherein the at least one pore in the porous support has an average pore size of 10 Angstroms.

2. The method of claim 1 wherein the metallocene catalyst comprises zirconium.

3. The method of claim 2 wherein the metallocene catalyst is bis(cyclopentadienyl)zirconium(IV).

4. The method of claim 1 wherein the porous support is a molecular sieve.

5. The method of claim 1 wherein the plastic is decomposed in the presence of from 0.1 part of the catalyst per one million parts of the plastic to 100 parts of the catalyst per 100 parts of the plastic.

6. The method of claim 1 wherein the decomposing occurs at a temperature of from 400° C. to 600° C.

7. The method of claim 1 further comprising purifying the hydrocarbon to form purified hydrocarbons.

8. The method of claim 7 wherein the purified hydrocarbons comprise gasoline, diesel fuel, or a combination thereof.

9. The method of claim 1 wherein the polyethylene is selected from the group of low density polyethylene, linear low density polyethylene, high density polyethylene, and combinations thereof.

10. The method of claim 1 wherein the plastic consists essentially of polyethylene, polypropylene, and combinations thereof.

11. The method of claim 10 wherein the polyethylene is selected from the group of low density polyethylene, linear low density polyethylene, high density polyethylene, and combinations thereof.

12. The method of claim 1 wherein the hydrocarbons have from 4 to 40 carbon atoms.

13. The method of claim 1 wherein the hydrocarbons have from 5 to 25 carbon atoms.

14. The method of claim 1 wherein the reducing agent is hydrogen gas.

15. The method of claim 1 wherein the plastic is decompressed in the presence of from 0.1 part of the catalyst per one million parts of the plastic to 100 parts of the catalyst per 100 parts of the plastic, wherein the depolymerization catalyst component is bis(cyclopentadienyl)zirconium(IV), wherein the reducing catalyst component comprises palladium, wherein the reducing agent is hydrogen gas, and wherein the porous support is a 13X molecular sieve.

* * * * *